(12) United States Patent
Gralka

(10) Patent No.: US 10,995,847 B2
(45) Date of Patent: May 4, 2021

(54) COOLING DEVICE FOR VEHICLE COMPONENTS

(71) Applicant: Ford Global Technologies, LLC, Dearborn, MI (US)

(72) Inventor: Bernhard Gralka, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 15/895,644

(22) Filed: Feb. 13, 2018

(65) Prior Publication Data

US 2018/0238436 A1 Aug. 23, 2018

(30) Foreign Application Priority Data

Feb. 21, 2017 (DE) .................... 102017202789.4

(51) Int. Cl.
*F16H 57/04* (2010.01)
*F01M 5/00* (2006.01)
*F01M 11/00* (2006.01)

(52) U.S. Cl.
CPC ......... *F16H 57/0423* (2013.01); *F01M 5/002* (2013.01); *F01M 11/0004* (2013.01); *F01M 2011/0025* (2013.01); *F01M 2011/0058* (2013.01)

(58) Field of Classification Search
CPC ............... F16H 57/0423; F01M 5/002; F01M 11/0004; F01M 2011/0025; F01M 2011/0058
See application file for complete search history.

(56) References Cited

U.S. PATENT DOCUMENTS

| | | | | |
|---|---|---|---|---|
| 1,365,438 A | * | 1/1921 | Adamson | F01M 11/0004 184/104.3 |
| 1,653,427 A | * | 12/1927 | Beebee | F01M 5/002 184/104.3 |
| 2,062,509 A | * | 12/1936 | Francisco | B60H 1/00335 165/51 |
| 3,057,434 A | * | 10/1962 | Hanley | F16N 13/20 184/6.28 |
| 4,022,272 A | * | 5/1977 | Miller | F01P 11/08 165/51 |
| 4,848,453 A | * | 7/1989 | Evans | F16H 57/0415 165/44 |
| 4,922,765 A | * | 5/1990 | Hayakawa | B60K 17/344 184/6.12 |

(Continued)

FOREIGN PATENT DOCUMENTS

DE 4243593 A1 7/1993
DE 102012111967 A1 6/2014
(Continued)

*Primary Examiner* — Michael A Riegelman
(74) *Attorney, Agent, or Firm* — Geoffrey Brumbaugh; McCoy Russell LLP

(57) ABSTRACT

Methods and systems are provided for a cooling device connected to components of a motor vehicle. The cooling device influencing a fluid flow moving past the vehicle components. In one example, a system may include a cooling device positioned below an oil sump. The cooling device may feature an apparatus such that a fluid flows between the apparatus and oil sump. The cooling device may also be positioned below a transmission housing.

19 Claims, 2 Drawing Sheets

(56) References Cited

U.S. PATENT DOCUMENTS

| | | | | |
|---|---|---|---|---|
| 4,995,971 | A * | 2/1991 | Droste | F01M 11/0004 |
| | | | | 210/167.03 |
| 5,408,965 | A * | 4/1995 | Fulton | F01M 5/002 |
| | | | | 123/196 AB |
| 5,440,951 | A * | 8/1995 | Okada | B60K 17/105 |
| | | | | 475/159 |
| 5,477,936 | A * | 12/1995 | Sugioka | B60L 53/14 |
| | | | | 180/68.5 |
| 5,657,830 | A * | 8/1997 | Kawashima | B62K 25/283 |
| | | | | 180/220 |
| 5,809,845 | A * | 9/1998 | Shimizu | B60K 17/105 |
| | | | | 74/606 R |
| 6,105,464 | A * | 8/2000 | Shimizu | B60K 17/105 |
| | | | | 184/6.25 |
| 6,443,263 | B1 * | 9/2002 | Ito | F01M 1/12 |
| | | | | 123/196 R |
| 7,150,286 | B2 * | 12/2006 | Apostolides | F01M 11/0408 |
| | | | | 137/14 |
| 8,544,583 | B2 | 10/2013 | Ajisaka | |
| 10,344,847 | B2 * | 7/2019 | Palmer | F16H 57/0412 |
| 2012/0024611 | A1 * | 2/2012 | Ajisaka | B60K 11/08 |
| | | | | 180/68.1 |
| 2012/0153681 | A1 * | 6/2012 | Ajisaka | B60K 11/08 |
| | | | | 296/208 |
| 2012/0168115 | A1 * | 7/2012 | Raimarckers | F01D 25/02 |
| | | | | 165/41 |
| 2016/0130995 | A1 * | 5/2016 | England | F01M 11/0004 |
| | | | | 184/1.5 |
| 2018/0238436 | A1 * | 8/2018 | Gralka | F01M 11/0004 |

FOREIGN PATENT DOCUMENTS

| | | |
|---|---|---|
| EP | 2193984 A1 | 6/2010 |
| GB | 2457382 A | 8/2009 |
| JP | 2004092723 A | 3/2004 |

* cited by examiner

COOLING DEVICE FOR VEHICLE COMPONENTS

CROSS REFERENCE TO RELATED APPLICATION

The present application claims priority to German Application No. 102017202789.4, filed on Feb. 21, 2017. The entire contents of the above-referenced application are hereby incorporated by reference in its entirety for all purposes.

FIELD

The present description relates generally to methods and systems for a cooling device mounted to vehicle components.

BACKGROUND/SUMMARY

The present application is directed to a drive unit for a motor vehicle including a motor with a motor oil sump and a transmission. The transmission may include a transmission housing. A cooling device may be used for reducing the temperature of the motor, transmission, or both.

Cooling of the motor or transmission oil if often utilized even during normal operation. Cooling may be further utilized in the case of high payload, trailer load or high motor rotational speeds.

Previous attempts to cool transmission oil or engine oil have included transmission heat exchangers or oil coolers, which are operated with a coolant. The generated heat may be reduced if it is not possible to adequately reduce the temperature. Otherwise, motor and transmission damage can occur. One method of reducing generated heat would be to reduce the load or speed of the engine but this method limits the usability of the engine.

However, the inventors herein have recognized potential issues with such systems. As one example, transmission heat exchangers or oil coolers require additional weight and space. The components are also susceptible to faults and may have high cost.

In one example, the issues described above may be addressed by a drive unit for a motor vehicle having: a motor with a motor oil sump; a transmission with a transmission housing; and a cooling device including a flow-guiding apparatus and a fastening apparatus, wherein the cooling device is fastened to at least one of the motor oil sump or to the transmission housing by the fastening apparatus and wherein the flow-guiding apparatus is arranged spaced apart from at least one of the motor oil sump or the transmission housing such that a cooling fluid may flow between the flow-guiding apparatus and at least one of the motor oil sump or the transmission housing. In this way, the flow-guiding apparatus directs the cooling fluid past the engine and transmission housing which may increase heat transfer.

As one example, a flow-guiding apparatus may extend along the motor oil sump and transmission housing. This apparatus is shaped to conduct a cooling fluid between the apparatus and the oil sump and transmission housing. One embodiment includes a flow-guiding apparatus in which the distance between the apparatus and oil sump increases towards the front of the vehicle. This shape may increase the flow of the cooling fluid past the oil sump and transmission housing. Further embodiments include a fastening apparatus which fits into a groove in the flow-guiding apparatus. This arrangement maximizes surface contact between the flow-guiding apparatus and fastening apparatus which may increase heat transfer away from the oil sump and transmission housing. Thus, the use of the flow-guiding apparatus helps to draw heat from the oil sump and transmission housing. The embodiments of the present application may reduce the motor and transmission oil temperature.

These embodiments may be simple to implement, require less additional space than conventional approaches, low weight, high reliability, and low cost.

Embodiments described in this application use at least two methods to improve the cooling of the motor and transmission oil temperature. One method is to improve heat conductance between vehicle components, such as motor oil sump and transmission housing, and a cooling device. A second method is to improve the heat transfer to a cooling fluid which flows past the motor oil sump and/or the transmission housing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1 and 2 are shown approximately to scale

DETAILED DESCRIPTION

Figure 1:
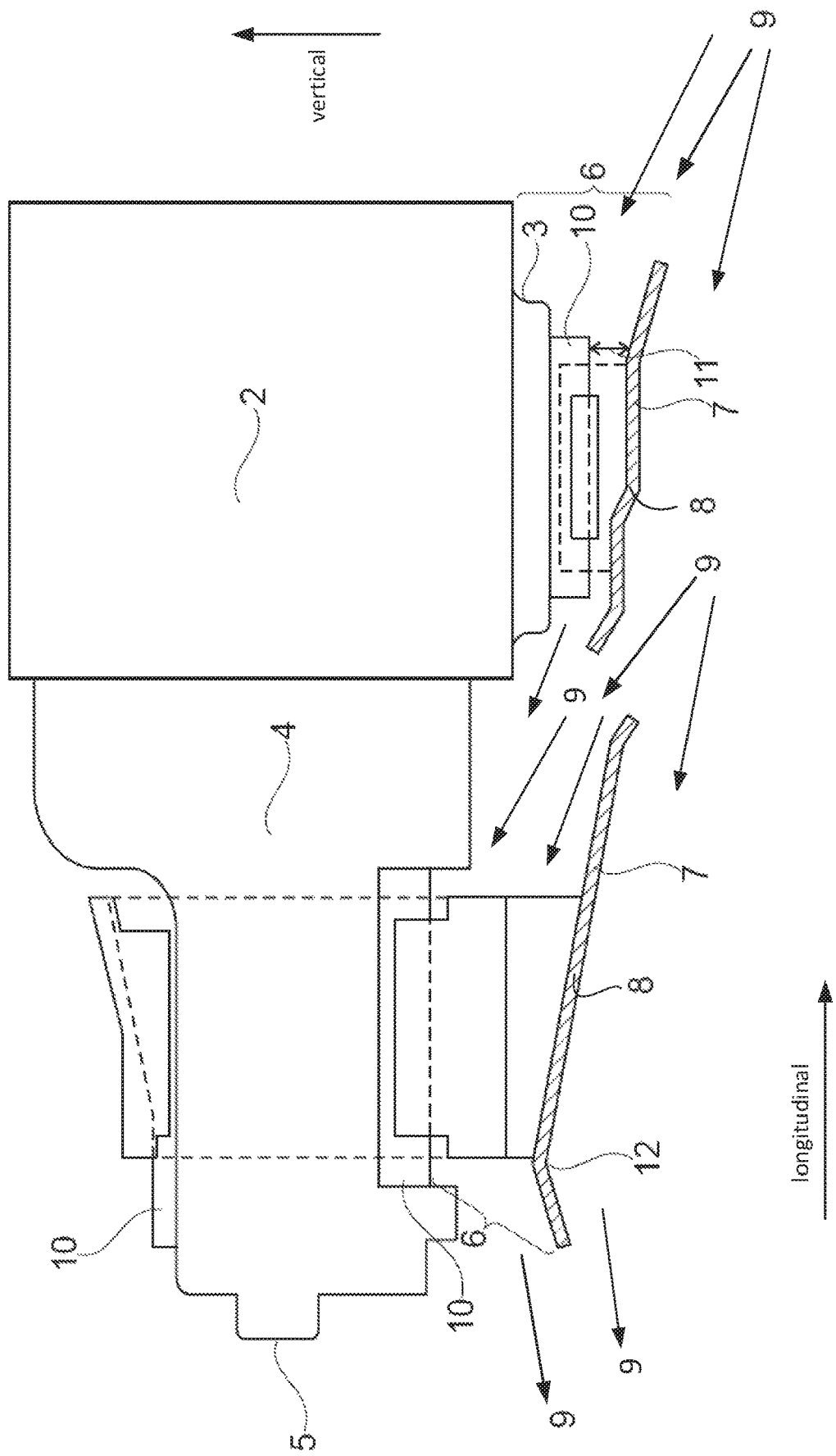
FIG. 1 shows a schematic representation of a drive unit and flow-guiding apparatus.

The following description relates to systems and methods and systems for cooling devices for vehicles. These cooling devices may increase cooling performance of the vehicle by conducting a cooling fluid past key components of the vehicle. For example, a cooling device may conduct air past the motor oil sump which may reduce the heat of the motor oil. Furthermore, the cooling device may further conduct heat from the vehicle components. For example, a sheet metal cooling device may be connected via a metal fastening apparatus to a transmission housing. In this embodiment, heat is transferred from the transmission housing to the cooling device via the fastening apparatus.

One embodiment includes a drive unit for a motor vehicle which has a motor with a motor oil sump for providing the motor oil, a transmission with a transmission housing for providing transmission oil and a cooling device for reducing the motor and/or transmission oil temperature. The cooling device may extend along the motor oil sump, along the transmission housing or along both components. Separate cooling devices can also be provided for the motor oil sump and transmission housing. For example, the cooling device may be arranged below the motor oil sump and the transmission housing, relative to the installation position in the vehicle. The cooling device may extend along the motor oil sump and the transmission housing depending on the cooling requirement and available space. The cooling device may extend part of this length or be comprised of several components. For example, two cooling device may be mounted below the motor oil sump and transmission housing.

The cooling device may include a flow-guiding apparatus and one or more fastening apparatuses. The fastening apparatuses fasten the cooling device to the motor oil sump and to the transmission housing. These fasteners may be configured to maximize heat conduction of the components. The fasteners may form a contact surface between a cooling device and vehicle components, such as a motor oil sump and transmission housing. The contact surface may be configured to be as large as possible to maximize the heat discharged from the motor oil sump or transmission housing. In one embodiment, the fastening apparatus is composed of grooves which are connected to ribs extending from the motor oil sump or transmission housing. The grooves and ribs have a high contact area that improves heat conduction.

Heat is conducted from the motor oil sump, the transmission housing or both to the flow-guiding apparatus via the fastening apparatus. The flow-guiding apparatus outputs to the surroundings, such as a cooling fluid which flows past.

The flow-guiding apparatus may be arranged spaced apart from the motor oil sump or from the transmission housing in such a manner that a cooling fluid can flow between the flow-guiding apparatus and the vehicle components including the motor oil sump and the transmission housing.

The flow-guiding apparatus may guide the flow of the cooling fluid along the motor oil sump and the transmission housing. In other words, a cooling fluid flow may be guided by means the flow-guiding apparatus past the motor oil sump and the transmission housing such that the oil located therein can be cooled.

Embodiments described combine at least two means of removing heat. The heat transfer via a contact surface between vehicle components, such as the motor oil sump and transmission housing, and the cooling device is maximized. Furthermore, the heat transmission to a cooling fluid flow is also maximized. Embodiments may be implemented easily, have low cost, high reliability, low weight and low space requirement.

In one exemplary embodiment depicted in FIG. 1, drive unit has a motor 2 with a motor oil sump 3 as well as a transmission 4 with a transmission housing 5. Both motor oil sump 3 and transmission housing 5 have ribs 10. In this embodiment, the transmission 4 is arranged behind motor 2 or toward the rear of the vehicle.

In some embodiments, motor or transmission oil to be cooled may be located both in motor oil sump 3 and in the transmission housing 5. Heat may be discharged from motor oil sump 3 and transmission housing 5. The heat may be discharged to the fastening apparatus or to the cooling fluid.

In the embodiment shown in FIG. 1, two cooling devices 6 are provided below motor oil sump 3 and transmission housing 5. A flow-guiding apparatus 7 composed of metal sheet and a fastening apparatus 8 are also included in the cooling devices. Fastening apparatus 8 fastens cooling device 6 in a heat-conducting manner to motor oil sump 3 or transmission housing 5.

According to various embodiments, the flow-guiding apparatus may be formed from a sheet. Metal may be used for the sheet material as metal generally has high heat conductivity. This high conductivity may discharge heat to the surroundings so that a high degree of cooling performance can be achieved. Other materials may also be used. In one embodiment plastic may be used for lower weight and lower cost.

A cooling effect may be caused by a flowing cooling fluid 9. In one embodiment, the air flow from the front of the vehicle in the direction of the rear of the vehicle is the cooling fluid. A flow-guiding apparatus 7 is arranged spaced apart from motor oil sump 3 or transmission housing 5 in such a manner that cooling fluid 9 can flow between flow-guiding apparatus 7 and motor oil sump 3 or transmission housing 5.

The cooling fluid may be air. For example, the air flow generated by the driving movement of the vehicle can be used as a flowing cooling fluid. Air generally flows counter to the direction of travel of the vehicle. Therefore, the flow-guiding apparatus may be fastened to the motor oil sump and to the transmission housing in such a manner that the cooling fluid flowing counter to the direction of travel is guided along the motor oil sump or the transmission housing.

One or more ventilators or fans may also be provided to generate an air flow as a cooling fluid flow. This additional flow may increase cooling performance and may be used when other fluid flow is low.

Distance 11 between flow-guiding apparatus 7 and motor oil sump 3 or transmission housing 5 may be variable. In an embodiment, distance 11 reduces in portions of the flow-guiding apparatus. One embodiment may reduce the distance 11 in the direction of the rear of the vehicle, from right to left as depicted in FIG. 1. The motor oil sump 3 or transmission housing 5 and flow-guiding apparatus 7 may form a funnel-shaped opening at the end of flow-guiding apparatus 7. This distance variation forming a funnel shape may increase the amount of cooling fluid 9 flowing through the cooling device 6. This funnel shape may be positioned to capture cooling fluid 9 in the direction of travel of the vehicle.

The flow-guiding apparatus 7 may take the form of many shapes. Metal flow-guiding apparatuses may be easily formed to a variety of shapes. In one embodiment, the flow-guiding apparatus is composed of sheet metal and includes a plurality of bends. These bends may decrease the distance between the flow-guiding apparatus and components of the engine such that the velocity of the cooling fluid increases as the fluid moves through the apparatus. Other embodiments may include bends that conform to the contours of the vehicle components that the flow-guiding apparatus is attached to. In one embodiment the flow-guiding apparatus may bend upward in areas positioned toward the sides of the vehicle which may increase air flow past particular vehicle components. Further embodiments may include bends in the sheet metal that provide space for vehicle components. Still further embodiments may include bends that create ground clearance in particular portions of the flow-guiding apparatus.

Flow-guiding apparatuses may take the form of complex shapes. These shapes may be designed based on the vehicle components that they are connected to. In one embodiment, the air flow past vehicle components is analyzed and a plastic flow-guiding apparatus is created with shapes to maximize the air flow. Other embodiments may use fluid analysis to reduce turbulence and drag created by the cooling fluid. These factors could adversely affect fuel economy of the vehicle. In other embodiments, turbulent or laminar flow may be induced in particular regions in order to affect heat transfer. One embodiment includes a plastic flow-guiding apparatus that induces substantially laminar flow in the areas in which the cooling fluid enters and exits the area between the flow-guiding apparatus and vehicle components. However, this embodiment may induce turbulence around a component to be cooling such as the motor oil sump.

Further embodiments of the flow-guiding apparatus may be shaped to affect forces imparted on the vehicle by the cooling fluid. When a fluid passes by a vehicle it may induce a force on the vehicle depending on the shape of the vehicle. The flow-guiding apparatus may change the way in which the fluid moves past the vehicle and thus may change the forces imparted on the vehicle. In one embodiment, the flow-guiding apparatus may be shaped such that a downforce caused by the cooling fluid is minimized.

The length of the flow-guiding apparatus may also change. Some embodiments of the flow-guiding apparatus may extend the length of a vehicle component that is too be cooled. One embodiment includes a flow-guiding apparatus that extends the length of the motor oil sump. Alternatively, other embodiments include flow-guiding apparatus may be extend below several vehicle components. One embodiment includes a flow-guiding apparatus that begins at the front of the engine and extends through the rear of the transmission housing. The flow-guiding apparatus may also be comprised of multiple components. In one embedment a flow-guiding apparatus may extend below the motor oil sump and another below the transmission housing. Further embodiments may include a flow-guiding apparatus that extends past multiple vehicle components and includes inlets in the flow-guiding apparatus to allow cooling fluid to enter the space.

The width of the flow-guiding apparatus may also change. Some embodiments may include a flow-guiding apparatus with a width similar to the component to be cooled. Other embodiments include a flow-guiding apparatus with a width wider than the component. Embodiments may also include bends in the flow-guiding apparatus that change the distance between the flow-guiding apparatus and vehicle in a horizontal direction. In one embodiment the flow-guiding apparatus may bend upwards towards the sides of the vehicle. These bends may prevent the cooling fluid from escaping and thus increase cooling fluid flow past the components to be cooled.

According to further embodiments, the distance between the flow-guiding apparatus and the motor oil sump or between the flow-guiding apparatus and the transmission housing may be variable. Variation of this distance may influence the speed of flow of the cooling fluid and therefore the heat transfer.

According to various embodiments, the distance between the flow-guiding apparatus and the motor oil sump or the transmission housing may decrease over the length of the flow-guiding apparatus or in portions of the apparatus. As a result, the speed of flow of a cooling fluid flowing counter to the forward direction of travel of the motor vehicle may increase in the direction of flow and the cooling action may be improved.

In one embodiment, the flow-guiding apparatus may be spaced apart from the motor oil sump or the transmission housing in such a manner that the speed of flow of the cooling fluid flow increases in the direction of flow. The distance may be selected to form a funnel-shaped opening. One embodiment may feature the distance between the flow apparatus and vehicle components decreasing in the direction of flow.

Another embodiment of the flow-guiding apparatus 7 may feature a spoiler edge 12. In one embodiment the spoiler edge is positioned toward the rear of the vehicle and is part of cooling device 6 fastened to the transmission housing 5. The spoiler edge may reduce turbulence in the cooling fluid flowing past it. In one embodiment an edge can be formed wherein the distance between the flow apparatus and vehicle components increases towards the terminal edge. For example, the rear end, relative to the vehicle, of the flow-guiding apparatus may have a spoiler edge.

The shape of the flow-guiding apparatus 7 may create a vacuum pressure. This vacuum pressure may further influence flow of the cooling fluid 9 as it travels past the flow guiding apparatus 7. The spoiler edge 12 may be a portion of the flow-guiding apparatus 7 used to create the vacuum pressure. In one embodiment a spoiler edge 12 may be formed on a flow-guiding apparatus 7 positioned under the engine oil sump 3. This spoiler edge may create a vacuum pressure toward the rear of the flow-guiding apparatus 7. This vacuum pressure in the rear portion of the flow-guiding apparatus 7 may increase the velocity and volume of flow of cooling fluid 9. An increased velocity and flow of the cooling fluid 9 may increase the cooling effect on the engine oil sump 3.

The embodiments described make use of a flow of cooling fluid 9 to transfer heat from an oil sump 3 and transmission housing 5. The flow-guiding apparatus may be shaped to increase the velocity of the cooling fluid 9 which may increase the cooling of the oil sump 3 and transmission housing 5. One embodiment may increase flow in the direction of the rear of the vehicle and improve heat transfer between motor oil sump 3 and transmission housing 5.

Figure 2:
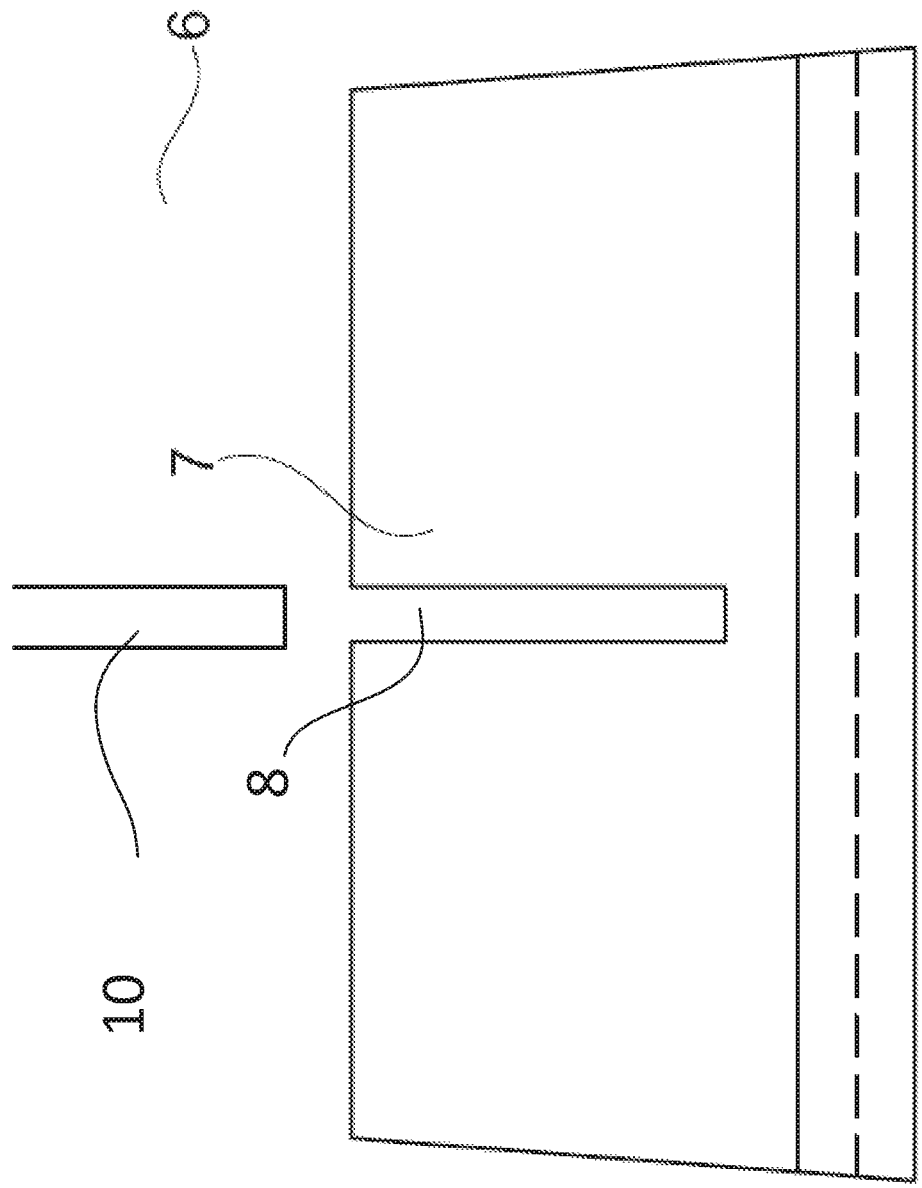
FIG. 2 shows a schematic detailed representation of the cooling device including the fastening apparatus.

Embodiments of the application may also transmit heat through the fastening apparatuses 8 to the flow-guiding apparatus 7. An embodiment of a cooling device 6 is shown in FIG. 2. The fastening apparatuses 8 are formed as grooves which are connected with ribs 10 of the motor oil sump 3 or of the transmission housing 5. A clamping connection may be made between the grooves and ribs 10. The clamping connection forms a contact surface, wherein a large contact surface contributes to effective transmission of heat.

The ribs 10 include planar faces. These planar faces may be connected to the motor oil sump 3 or transmission housing 5 to create a large contact surface. One embodiment includes planar ribs 10 extending lengthwise below the transmission housing 5 and being connected over a large area. This large contact surface conducts heat away from the motor oil sump 3 or transmission housing 5 into the ribs 10. The ribs 10 may be composed of metal. The large planar surfaces and thermal conductivity of metal may help the ribs 10 to transmit heat to the cooling fluid 9. The ribs 10 may also form connections with grooves in the fastening apparatus 8. An embodiment of the connection may also be formed lengthwise to maximize the contact area between the ribs 10 and the grooves. This high contact area may increase the amount of heat conducted from the ribs 10 to the fastening apparatus 8. The fastening apparatus 8 may also be composed of metal to increase the thermal conductivity of the apparatus. These large contact areas of the ribs and grooves may increase the cooling effect on the motor oil sump 3 or transmission housing 5 due to the increased heat transfer.

According to further embodiments, the motor oil sump and the transmission housing may have one or more ribs. The ribs may enhance cooling and provide mechanical strength. In one embodiment, the cooling device can be fastened to the ribs of the motor oil sump or the transmission housing.

In one embodiment, the fastening apparatuses of the cooling device may be formed as a groove. The groove may form a connection with the ribs of the motor oil sump or the transmission housing.

In an embodiment with a conical formation of grooves or ribs, a clamping connection can also be used. Either type of connection may offer the advantage of a large contact surface and thus contribute to improved heat conductance.

An embodiment may include two cooling devices, a first device positioned below motor a motor oil sump and a second positioned below a transmission housing. A first flow-guiding metal sheet is positioned below the first device and a second first flow-guiding metal sheet is positioned below the second device. The flow-guiding metal sheets do not overlap in a longitudinal direction but do overlap in the vertical direction. The flow-guiding metal sheets are each coupled to the sump and transmission housing, respectively. The flow-guiding metal sheet below and coupled to the transmission housing is bent, but has fewer bends than the flow-guiding metal sheet below and coupled to the engine oil sump. Each of the flow-guiding metal sheets are angled downward in a longitudinal forward direction from the transmission housing toward the engine. A rearward edge of the second flow-guiding metal sheet below the transmission housing is positioned higher than a forward edge of the second flow-guiding metal sheet. Further, a rearward edge of the first flow-guiding metal sheet below the sump is positioned higher than a forward edge of the first flow-guiding metal sheet. The first flow-guiding metal sheet is repeatedly bent, always resulting in the sheet metal being level or downward sloped, from the rear to the forward edge, with bends in different directions with respect to each other, including from rearward to the forward edge, a first upward bend, a second downward bend, and a third upward bend, and a fourth downward bend. In contrast, the second flow-guiding metal sheet below the transmission housing angles upward, then downward, from the rear to the forward edge. The second flow-guiding metal sheet has only downward bends, including a first and second downward bend. A rearward edge of the second flow-guiding metal sheet is higher than a forward edge of the second flow-guiding metal sheet, and higher than both the forward and rearward edges of the first flow-guiding metal sheet. A forward edge of the second flow-guiding metal sheet is below the rearward edge of the first flow-guiding metal sheet and above the forward edge of the first flow-guiding metal sheet.

According to further embodiments, the cooling device can be fastened by means of screws or rivets to the motor oil sump and to the transmission housing. In one embodiment, screws or rivets are fastened to ribs of the motor oil sump or of the transmission housing. Other methods of connection may also be used. One embodiment may include brackets which are connected to the vehicle components and flow-guiding apparatus. These brackets may be shaped in order to maximize contact area and heat transfer. These brackets may be attached by a variety of means including form fit connections, friction connections and material bonding such as welding.

In this way, the cooling devices remove heat from desired vehicle components. The cooling devices increase the transfer of heat from the vehicle components to a cooling fluid. The cooling device also absorb heat from the vehicle components and then transfer the heat to the cooling fluid.

FIGS. 1 and 2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drive unit for a motor vehicle having:
  a motor with a motor oil sump;
  a transmission with a transmission housing; and
  a cooling device including a flow-guiding apparatus and a fastening apparatus, wherein the cooling device extends from a first end of the motor oil sump and to a second of the transmission housing opposite the first end of the motor oil sump, and the cooling device is fastened by the fastening apparatus;
  the flow-guiding apparatus is arranged spaced apart from the motor oil sump and the transmission housing such that a cooling fluid may flow between the flow-guiding apparatus and the motor oil sump in a first section and the flow-guiding apparatus and the transmission housing in a second section, and a gap in the flow-guiding apparatus allows air flow to enter the flow-guiding apparatus between the first section and the second section.

2. The drive unit of claim 1, wherein the flow-guiding apparatus has a planar shape and the planar shape bends at least once to vary a distance between the planar shape and the motor oil sump or the transmission housing.

3. The drive unit of claim 1, wherein the flow-guiding apparatus is composed of metal.

4. The drive unit of claim 3, wherein a distance between the first section of the flow-guiding apparatus and the motor oil sump varies, a distance between the second section and the transmission housing varies, and the variations in distance change with bends in a planar shape.

5. The drive unit of claim 4, wherein the planar shape transitions at a bend from an orientation parallel with the motor oil sump or transmission housing to an orientation where a distance between the flow-guiding apparatus and the motor oil sump or the transmission housing decreases as the planar shape extends in a direction of the cooling fluid flow.

6. The drive unit of claim 4, wherein a bend in the planar shape forms a spoiler edge which increases the distance between the planar shape and the motor oil sump or the transmission housing.

7. The drive unit of claim 6, wherein the spoiler edge creates vacuum pressure.

8. The drive unit of claim 1, wherein the motor oil sump and the transmission housing have ribs which fit within grooves of the flow-guiding apparatus.

9. A cooling device for a motor vehicle:
the cooling device positioned below a motor oil sump, and the cooling device including a flow-guiding apparatus and a fastening apparatus;
the flow-guiding apparatus extending along and arranged spaced apart from the motor oil sump, the flow-guiding apparatus formed as a plate comprising one or more bends and each bend changing the orientation of the plate relative to the motor oil sump;
a first portion of the plate arranged parallel to or extending toward the motor oil sump, and a second portion of the plate extending further toward the motor oil sump relative to the first portion;
the fastening apparatus connecting the cooling device and the motor oil sump such that a cooling fluid may flow between the flow-guiding apparatus the motor oil sump; and
ribs extending downward from the motor oil sump and the ribs fit within grooves within the flow-guiding apparatus.

10. The cooling device of claim 9, wherein the flow-guiding apparatus includes two sections, a first section below the motor oil sump, and a second section below a transmission housing, and a gap between the first section and the second section allows cooling fluid to enter between the sections.

11. The cooling device of claim 10, wherein the flow-guiding apparatus is a metal sheet, and
in a third portion, the plate is oriented such that a distance between the flow-guiding apparatus and the motor oil sump or transmission housing increases as the plate extends in a direction opposite the cooling fluid flow.

12. The cooling device of claim 11, wherein in a fourth portion, a distance between the flow-guiding apparatus and the transmission housing increases as the plate extends in a direction of the cooling fluid flow.

13. The cooling device of claim 9, wherein the one or more bends in the plate are formed to reduce downforce.

14. The cooling device of claim 9, wherein each side of the groove and each side of the rib form face sharing contact.

15. A cooling device for a motor vehicle:
the cooling device connected to a transmission housing;
the cooling device including a flow-guiding apparatus and a fastening apparatus;
the flow-guiding apparatus formed as a plate extending along the transmission housing such that a cooling fluid may flow between the flow-guiding apparatus the transmission housing, and the plate comprising two or more bends which change an orientation of the plate relative to the transmission housing;
grooves within the plate of the flow-guiding apparatus which receive ribs of the transmission housing; and
the fastening apparatus connecting the cooling device and to planar shaped ribs extending from the transmission housing.

16. The cooling device of claim 15, wherein a second section of the flow-guiding apparatus is further connected to a motor oil sump, and
the flow-guiding apparatus includes cooling fluid inlets positioned between the second section of the flow-guiding apparatus and a first section of the flow-guiding apparatus connected to the transmission housing.

17. The cooling device of claim 16, wherein the flow-guiding apparatus is composed of plastic and includes rounded contours.

18. The cooling device of claim 15, wherein the flow-guiding apparatus extends from a front of an engine to a rear of the transmission housing.

19. The cooling device of claim 18, wherein the flow-guiding apparatus is a single component.

* * * * *